United States Patent [19]
Verdier

[11] 3,954,130
[45] May 4, 1976

[54] TIRE HAVING TREAD INCISIONS OF VARYING LENGTH

[75] Inventor: Henri Verdier, Beauregard-l'Eveque, France

[73] Assignee: Compagnie Generale des Etablissements Michelin, Clermont-Ferrand, France

[22] Filed: Aug. 4, 1975

[21] Appl. No.: 601,448

Related U.S. Application Data

[63] Continuation of Ser. No. 130,162, April 1, 1971, abandoned.

[52] U.S. Cl............................................. 152/209 R
[51] Int. Cl.².......................................... B60C 11/12
[58] Field of Search..................................... 152/209

[56] References Cited
UNITED STATES PATENTS
3,550,665   12/1970   Verdier.............................. 152/209

FOREIGN PATENTS OR APPLICATIONS
522,188   6/1940   United Kingdom............ 152/DIG. 3

Primary Examiner—James B. Marbert
Attorney, Agent, or Firm—Brumbaugh, Graves, Donohue & Raymond

[57] ABSTRACT

The tread of a tubeless tire for trucks has circumferential ribs the edges of which are formed with transverse incisions closely spaced apart from one another. The length of the incisions increases with depth in order to improve the wear properties of the tread.

3 Claims, 6 Drawing Figures

INVENTOR.
HENRI VERDIER
BY
Brumbaugh, Graves, Donohue & Raymond
his ATTORNEYS

TIRE HAVING TREAD INCISIONS OF VARYING LENGTH

This is a continuation of application Ser. No. 130,162, filed Apr. 1, 1971, now abandoned.

BACKGROUND OF THE INVENTION

This invention relates to tubeless tires and, more particularly, to tires of the radial-carcass type having improved new or recapped treads and intended to be used on vehicles of the truck class.

Truck tires of the radial type are generally provided with treads cut into circumferential ribs by means of grooves, generally but not necessarily four in number, extending over the entire periphery of the tread.

This type of molding leads, under certain circumstances, and particularly as a result of prolonged travel on highways, to a special form of wear: superimposed on the grooves there are formed two troughs that are wider but shallower than the grooves. In order to eliminate this form of wear, it has previously been proposed to cut the edges of the longitudinal ribs transversely by means of fine cuts of small length spaced closely from each other so as to make the side portions of the ribs more flexible than the central portions.

This means has proven effective and of great value; however, when it is sought to improve the effectiveness of the cuts still further, particularly by increasing their length, in order to increase the flexibility of the lateral portions of the ribs, the overall improvement is not as great as one might desire. An additional reduction in the characteristic wear described above has been noted, as a matter of fact, but in addition there has been observed the appearance of another special form of wear, this time affecting the longitudinal profile of the cut circumferential ribs—they assume a sawtooth shape.

SUMMARY OF THE INVENTION

An object of the present invention is to provide a further improvement in truck tire treads and, in particular, to reduce or eliminate both the trough wear and the sawtooth wear.

The foregoing and other objects are attained in accordance with the invention by the provision of a tire whose tread comprises—at least in its central portion—one or more circumferential ribs defined by grooves and the edges of which have substantially transversely oriented incisions spaced close to each other. The tire is characterized in that the length of the incisions increases towards the axis of the tire.

In one embodiment, the incisions are only in the deep layers of the tread and come to the surface only when the tread is partially worn. In this case about one-half of the thickness of the tread may be cut.

In another embodiment, the incisions extend from the surface of the tread in a new condition to a depth at least equal to that of the grooves.

Preferably, the incisions have their maximum length substantially at the level of the bottom of the grooves, the length decreasing slightly beyond that level if they extend beyond that level.

The maximum length of the incisions is between about 40 and 100% of the maximum width of the grooves measured transversely, or else between 3 and 20 millimeters. The width of the incisions may be reduced to a few tenths of a millimeter, or even less.

The arrangements in accordance with the invention that have thus been described considerably improve both the resistance to trough wear and the resistance to sawtooth wear of the new tire. When the thickness of the tire decreases as a result of generally uniform wear of the tread, the surface flexibility increases, which is favorable to a reduction in the trough wear and does not cause sawtooth wear, this wear occurring only in case of a substantial tread thickness. Moreover, the adherence qualities of the tire have a tendency to increase as wear occurs.

BRIEF DESCRIPTION OF THE DRAWING

An understanding of other aspects of the invention can be gained from a consideration of the following detailed description of the preferred embodiments thereof, in conjunction with the appended figures of the drawing, wherein.

DESCRIPTION OF THE PREFERRED EMBODIMENTS

Figure 1:
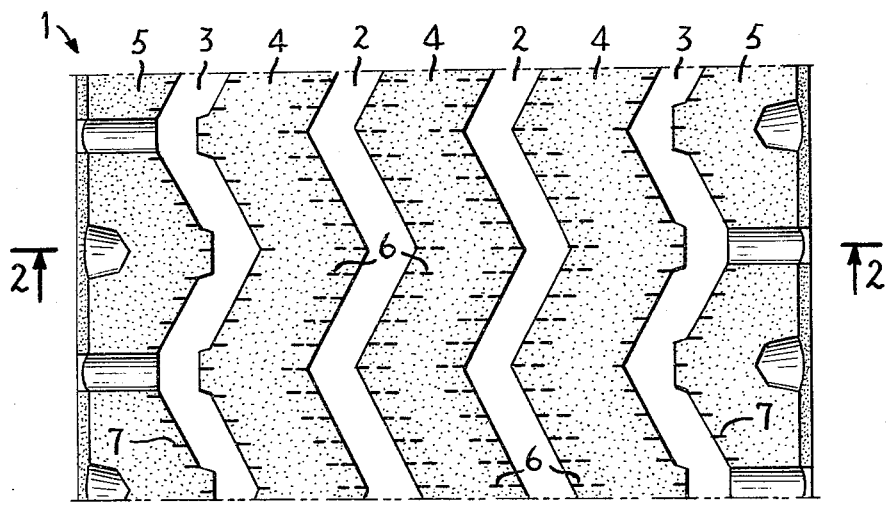
FIG. 1 is a plan view of a portion of a tire tread in accordance with the invention.
Figure 2:
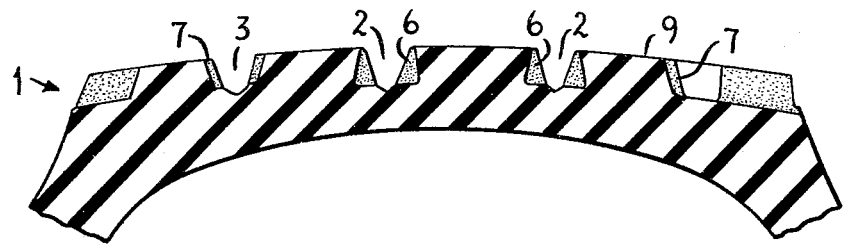
FIG. 2 is a cross-sectional view along the line 2—2 of FIG. 1 and looking in the direction of the arrows.

FIGS. 1 and 2 show a tread 1 of a tire of size 11.00–20 X. The tread has two zigzag-shaped central grooves 2 and two side grooves 3, also of zigzag shape, three substantially identical zigzag ribs 4, and two lateral ribs 5.

Figure 3:
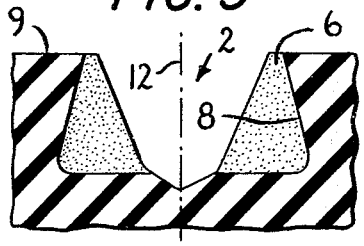
FIG. 3 is a fragmentary cross-sectional view on a larger scale than FIG. 2, showing one groove and two lateral incisions.

The edges of the ribs 4 adjacent to the grooves 2 have incisions 6, the cross section of which is shown in FIGS. 2 and 3. These incisions are spaced apart circumferentially by a distance that is close to half the width of the grooves 2. The edges of the ribs 4 and 5 adjacent to the grooves 3 have incisions 7 whose length does not vary from the surface towards the axis of the tire.

As FIG. 3 shows, each incision 6 has a substantially triangular shape the side 8 of which is inclined, moving farther away from the central line 12 of the groove 2 with increasing depth. At the level of the surface 9 of the tread the length of the incision is practically zero, while at the level of the bottom of the groove 2 the length of the incision is substantially equal to one-half the maximum width of the groove, that is to say, of the width measured at the level of the surface 9 of the tread 1. The width of the incision, that is to say, the distance between its two lips, is 0.2 mm.

Figure 4:
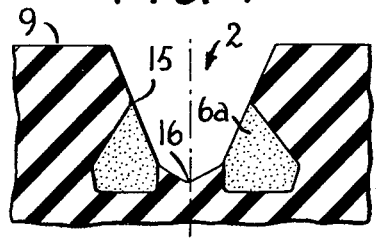
FIGS. 4, 5 and 6 are views similar to FIG. 3, showing various forms of incisions in accordance with the invention.

FIG. 4 shows an incision 6a which starts only at a certain distance from the surface 9 of the tread: namely, at the point 15, which, in the example selected, is 5 mm from the surface in new condition. Starting from the point 15, the incision 6a has a length that increases substantially to the level of the bottom 16 of the groove 2, over a depth of 7 mm in this example. At this level, the incision 6 has a length substantially equal to half of the maximum width of the groove 2. Thereupon the incision 6 is extended further a few millimeters in depth, narrowing slightly, as shown in the drawing. The width of this incision is 0.3 mm.

Figure 5:
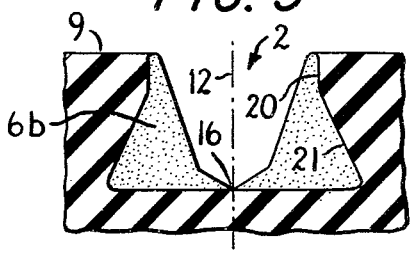

In the form shown in FIG. 5, the incision 6b is defined laterally by a line 20 that extends from the surface 9 of the tread parallel to the middle line 12 of the groove 2 over a depth which, in this example, is about 3 mm. This section 20 is followed by an inclined section 21 which moves farther away from the middle line 12 with increasing depth, down to the level of the bottom 16 of the groove 2. At this level the length of the incision is almost equal to the maximum width of the groove. The width of the incision is 0.6 mm in this example.

Figure 6:
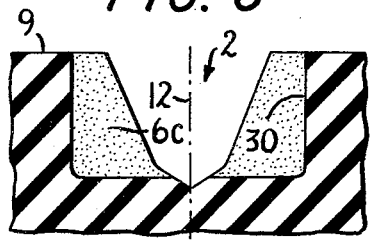

Each of the incisions 6c shown in FIG. 6 is of trapezoid shape with the side edge 30 substantially perpendicular to the surface 9 of the tread and therefore substantially parallel to the middle line 12 of the groove 2. The area of each incision corresponds approximately to half the cross-sectional area of the groove 2. The width of the incision is 0.5 mm in this example.

This invention is not limited to the embodiments described above, in particular with reference to the outline of the grooves 2 and 3 defining the circumferential ribs 4; it can, as a matter of fact, be applied with the same good results to tires whose tread has circumferential ribs defined by circumferential grooves of any outline, for instance linear or undulated, parallel to each other or not.

Thus, there is provided in accordance with the invention a novel and highly-effective truck tire adapted to wear more evenly than conventional truck tires, particularly when used in high-speed road travel. Many other embodiments within the spirit and scope of the invention will readily occur to those skilled in the art upon study of the present disclosure. Accordingly, the invention is to be construed as including all of the embodiments thereof within the scope of the appended claims.

I claim:

1. A truck tire comprising a tread, said tread being formed, at least in its central portion, with a plurality of grooves defining at least one circumferential rib, the edges of said circumferential rib being formed with transverse incisions closely spaced apart from one another, the length of said incisions in the transverse direction increasing substantially with increasing depth, and the central portion of said rib being substantially free of incisions, wherein said incisions open into said grooves below the surface of said tread in new condition and do not open into the surface of said tread in new condition.

2. A truck tire comprising a tread, said tread being formed, at least in its central portion, with a plurality of grooves defining at least one circumferential rib, the edges of said circumferential rib being formed with transverse incisions closely spaced apart from one another, the length of said incisions in the transverse direction increasing substantially with increasing depth, and the central portion of said rib being substantially free of incisions, wherein said incisions open into said grooves between the bottoms of said grooves and a point substantially midway between the bottoms of said grooves and the surface of said tread in new condition and do not open into said grooves between said midway point and the surface of said tread.

3. A truck tire comprising a radial carcass and a tread, said tread being formed, at least in its central portion, with a plurality of zigzag grooves defining at least one circumferential zigzag rib, the edges of said circumferential zigzag rib being formed with transverse incisions closely spaced apart from one another, said incisions having a generally triangular shape and each opening into one of said zigzag grooves and having one side defined by the rubber of said tread and at another side defined by said one of said zigzag grooves, said one side being inclined with respect to the central line of said one of said zigzag grooves in such a manner as to move substantially farther away from said central line with increasing depth, the length of said incisions in the transverse direction therefore increasing substantially with increasing depth, and the central portion of said circumferential zigzag rib being substantially free of incisions.

* * * * *